Oct. 30, 1928.
E. C. WEISGERBER
LIQUID LEVEL CONTROL FOR PRESSURE TANKS
Filed Sept. 14, 1925
1,689,654
3 Sheets-Sheet 1
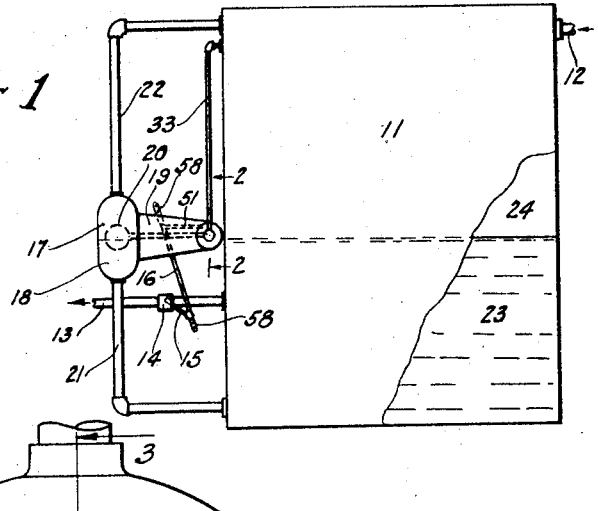
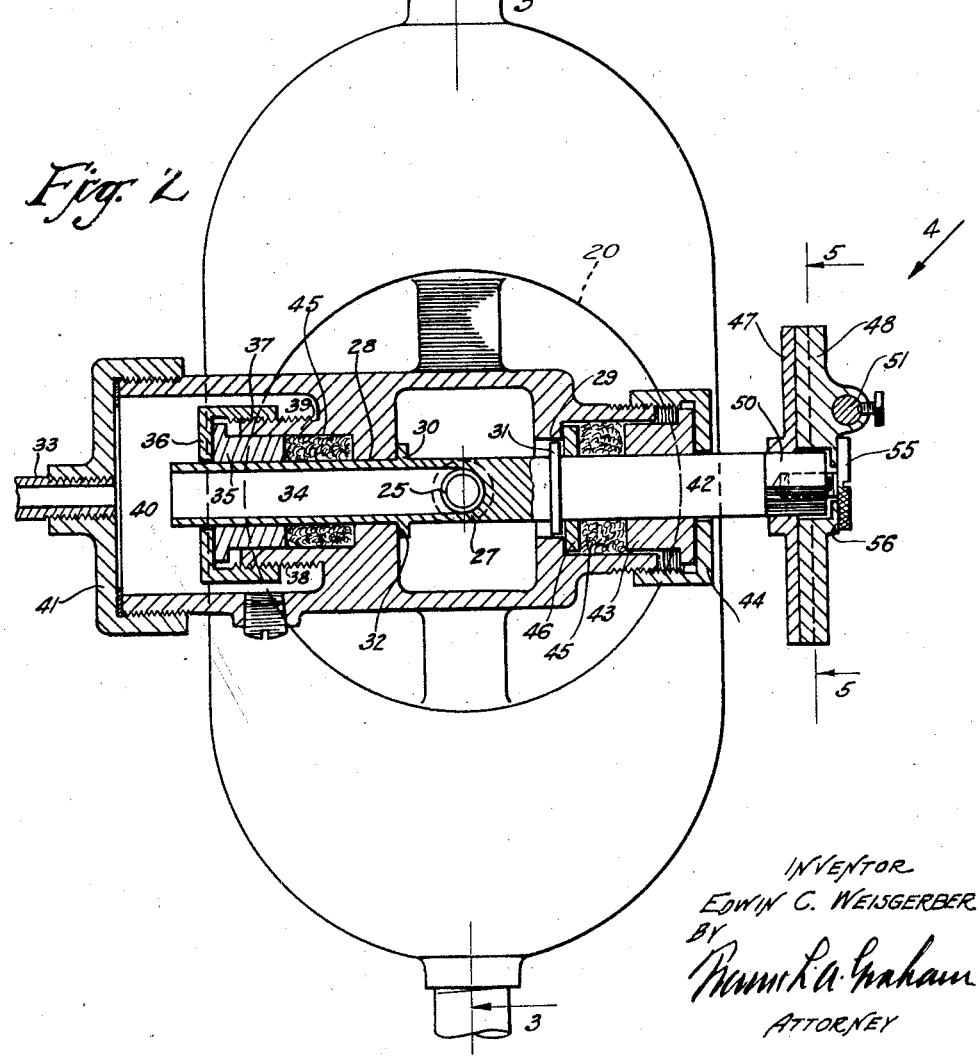
INVENTOR
EDWIN C. WEISGERBER
BY
ATTORNEY Oct. 30, 1928.　　　　　　　　　　　　　　　1,689,654
E. C. WEISGERBER
LIQUID LEVEL CONTROL FOR PRESSURE TANKS
Filed Sept. 14, 1925　　　3 Sheets-Sheet 2

INVENTOR
EDWIN C. WEISGERBER
BY
ATTORNEY

Oct. 30, 1928.
E. C. WEISGERBER
1,689,654
LIQUID LEVEL CONTROL FOR PRESSURE TANKS
Filed Sept. 14, 1925    3 Sheets-Sheet 3
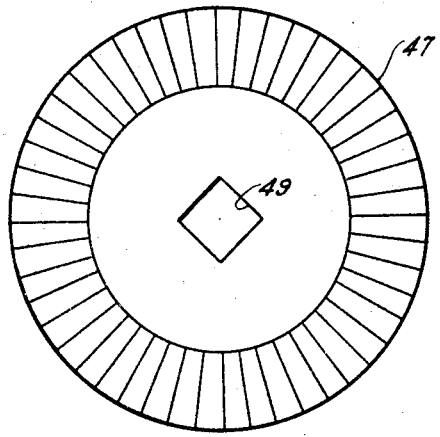
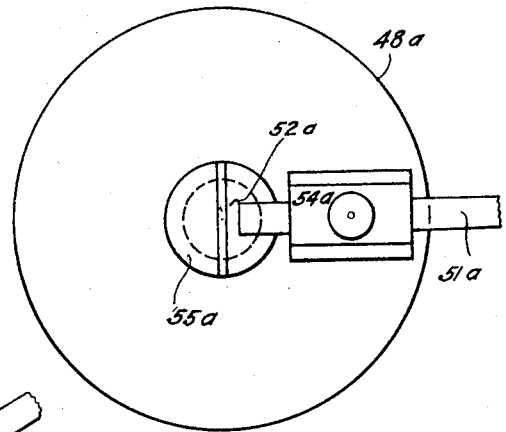
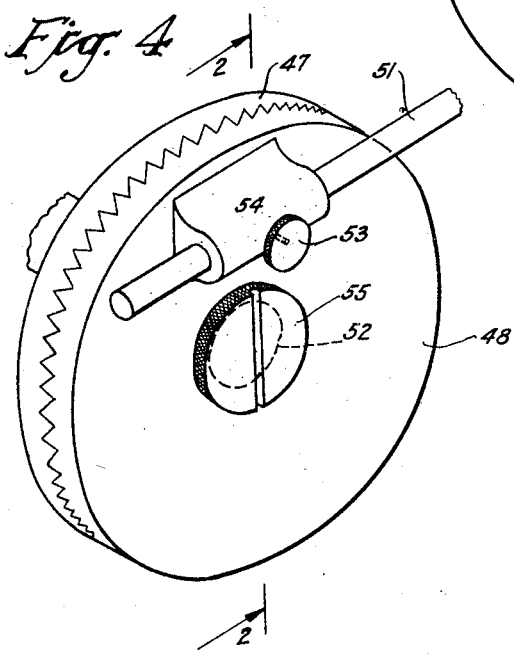
INVENTOR
EDWIN C. WEISGERBER
BY
ATTORNEY Patented Oct. 30, 1928.

1,689,654

UNITED STATES PATENT OFFICE.

EDWIN C. WEISGERBER, OF LOS ANGELES, CALIFORNIA, ASSIGNOR TO PETROLEUM APPLIANCE SYNDICATE, OF LOS ANGELES, CALIFORNIA, A BUSINESS TRUST.

LIQUID-LEVEL CONTROL FOR PRESSURE TANKS.

Application filed September 14, 1925. Serial No. 56,250.

Although my present invention is entitled boardly as referring to liquid level control for pressure tanks, I may state at the outset that this invention relates more particularly to control devices adapted to be placed externally of such tanks (or of stills or of gas traps, or of other receptacular elements such as are used in the oil industry) but which comprise floats responsive to variations in the level of contained liquids, and valves responsive to the movements of said floats; and it is an especial object of this invention to provide organizations of the general character referred to (comprising secondary receptacles or float chambers in open communication with main receptacles) with novel means for admitting fluid pressure to the interiors of said floats, to prevent collapse thereof.

It is a further object of my invention to provide unique and easily adjustable or replaceable bearing assemblies suitable for the support of shafts through which pressure may be admitted to the interiors of floats, in a manner not interfering with the sensibility of the organizations comprising the same.

It is a further object of my invention to provide organizations of the general character referred to with improved means for transmitting motion from a float to a valve, which may be an inlet or an outlet valve, controlled thereby.

Other objects of my invention may be best understood from the following descriptions of alternative embodiments thereof, taken in connection with the appended claims and the accompanying drawings, in which Fig. 1 is a somewhat diagrammatic elevational view showing one type of oganization, which may be a gas trap, in which an embodiment of my invention is incorporated.

Fig. 2 is an enlarged partial section, taken substantially as indicated by the lines 2—2 of Figs. 1 and 4.

Fig. 4 is an enlarged detail perspective view taken from the general direction suggested by the arrow 4 of Fig. 2.

Fig. 5 is an elevational detail view, taken substantially as indicated by the line 5—5 of Fig. 2.

Fig. 6 is a view on the same scale as Fig. 5, showing the outer surface of an outer plate adapted to cooperate with an inner plate of the character shown in Fig. 5, said outer plate being provided with means for securing a valve-operating arm radially thereon, and the relationships between the mentioned plates being variable substantially in the manner illustrated in Figs. 1, 2 and 4, and hereinafter described.

Figure 7:
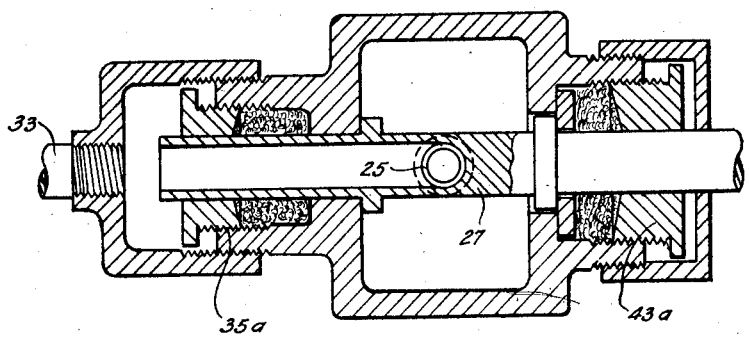

Fig. 7 is a view corresponding to the central portion of Fig. 2, but illustrating an alternative form.

Referring to the details of that specific embodiment of my invention chosen for purposes of illustration in Figs. 1 to 6 inclusive, 11 may be a main receptacular element such as a gas trap provided with an inlet 12 and with an outlet 13, this outlet being shown as equipped with a valve 14 adjustable by means of an arm 15; and the unique features of my invention relate more particularly to means for imparting desired movement to an element such as the link 16, by which the inclination of the arm 15, and the consequent opening and closing of the valve 14, or its equivalent, may be controlled.

For example, I may provide, adjacent the main receptacle 11, a subsidiary receptacle or float chamber 17, shown as comprising a globular or elliptical portion 18 and an extension 19, said elliptical portion being of a form and size such as to permit a considerable rise and fall of a float 20, shown as spherical, and being in free communication, as by separate pipes 21 and 22, with the interior of the tank or main receptacle 11,—the downwardly extending pipe 21 preferably terminating well below the intended level of the liquid 23 in the tank 11, or its equivalent, and the upwardly extending pipe 22 being in communication with the vapor or air space 24 above said liquid; and the extension 19 may be of such form and size as to permit a corresponding rise and fall of a hollow arm 25, establishing communication between the interior 26 of the float 20 and a completely or partially hollow shaft 27, by means of which said arm is pivoted.

It will be appreciated that the communicating passages provided by the pipes 21 and 22 assure the maintenance of a substantially uniform liquid level within the float chamber 17, or its equivalent, and the tank 11, or its equivalent, and I may utilize the hollow shaft 27, or its equivalent, not only in the transmission of motion from float 20, but also in the establishment of an interior pressure, within said float, identical with the pressure within said tank.

Figure 3:
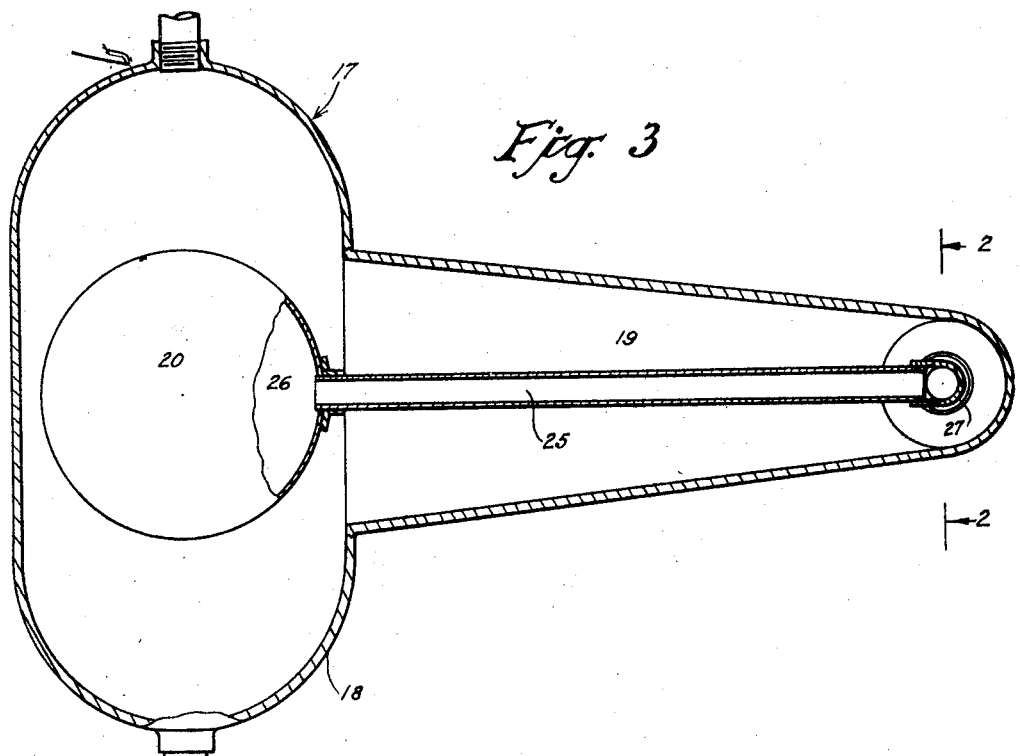
Fig. 3 is a vertical section, on an intermediate scale, corresponding to the left central portion of Fig. 1, with parts broken away or omitted for the sake of clearness, this view being taken substantially as indicated by the line 3—3 of Fig. 2.

As suggested in Figs. 2, 3 and 4, I may so shape the inner or narrow end of the extension 19 as to provide bearings at 28 and 29 for the shaft 27, said shaft being shown as provided with a pair of integral collars or flanges 30 and 31, the former of which is shown as adapted to engage a substantially vertical wall 32 at the inner end of the bearing 28,—thereby limiting the inward movement of the shaft 27, which is shown as insertible through the opening which constitutes the mentioned bearing 29 for the collar 31. In order to prevent lateral leakage of air or gas or vapor, I may associate with the mentioned bearings suitable glands, adapted to permit relative rotation of the shaft 27 and to permit the mentioned transmission of fluid pressure from the space 24 in the tank 11, as by way of an additional and unobstructed separate pipe 33, to a passage 34, shown as coaxial with the shaft 27, —the pipe 33 being shown as external to both the tank 11 and the float chamber 17.

To prevent leakage past the bearing 28, I may employ means such as a snugly fitting hollow plug or gland element 35, shown in Fig. 2 as forced inward by means of an apertured cap 36, interiorly threaded at 37 for engagement with an exterior thread 38 upon a laterally extending boss 39, which projects into a chamber 40,—this chamber being shown as closed by a threaded cap 41 into and through which the mentioned pipe 33 may extend; and the opposite or solid end 42 of the shaft 27 may be provided not only with a hollow plug or gland element 43, pressed inward by an apertured and threaded cap 44 (packing 45 being inserted in each of the mentioned glands in a usual manner) but also with a washer 46, or its equivalent, adapted to serve as a thrust bearing engageable by the mentioned bearing collar 31 upon the shaft 27.

It will be obvious that the described construction (or the equivalent construction shown in Fig. 7 as comprising threaded plugs 35$^a$ and 43$^a$ and obviating the use of an interior cap such as the cap 36) may be effective to permit a transmission of pressure from the tank 11 to the interior of the float 20, while permitting free rotation of the shaft 27 and avoiding leakage past the bearings thereof; and, in order to transmit motion from said shaft to the link 16, or its equivalent, I may employ means of the general character illustrated in Figs. 2, 4, 5 and 6 as comprising a pair of radially serrated discs 47 and 48,—the former of these discs being shown as provided with a polygonal opening 49, adapted to interfit with a correspondingly shaped terminal portion 50 of the shaft 27, and the complemental disc 48 being shown as provided not only with means for carrying an arm 51, whose outer end may be pivoted to the link 16, but as provided with a substantially central circular opening of sufficient diameter to permit the rotative adjustment of this disc relatively to the inner disc 47,—the squared or other polygonal end 50 of the shaft 27 being of less diameter than the opening 52.

As suggested in Figs. 2 and 4, the arm 51 may be secured to the outer disc 48 by means such as a set screw, 53, threaded into a guide 54, through which the arm 51 may extend; and the described discs may be maintained in any predetermined relationship, by means such as a central screw 55, shown as threaded into the squared end 50 of the shaft 27 and as adapted to engage an annular shoulder 56 upon the outer disc 48. In order to obviate interference between the arm 51 (the length of this arm being variable by a longitudinal movement thereof beneath the set screw 53, and the direction thereof being variable by a change in the angular relationship between the mentioned discs) the guide 54 may be laterally offset, substantially in the manner illustrated in Fig. 4; or, as suggested in Fig. 6, assuming the axis of the guide 54$^a$ to be disposed radially of the axis of rotation of the disc 48$^a$, the form and dimensions of the guide 54$^a$ and the position of the radial passage therethrough for the arm 51$^a$ may be such as to permit the inner end of this arm to extend over the screw 55$^a$, by which said outer disc 48$^a$ is secured in its adjusted position.

It will be appreciated that the details last referred to are minor features of my invention, all forms thereof being adapted to provide for an admission of fluid pressure to the interior of a valve float and adapted also to facilitate transmission of motion from such a float to an outlet or inlet valve, permitting wide range of adjustment not only by variations in the angular relationships between interfitting discs but by changes in the lengths of the respective arms 15 and 51, or in the points of connection between said arms and the link 16 or its equivalent,—the latter element being optionally provided at its ends with series of holes 58, or with equivalent means for varying the effective length of said link or its points of attachment to either or both of the mentioned arms.

Although I show the float chamber 17 as external to the tank 11 and as supported by the mentioned pipes 21, 22 and 33, it will be appreciated that various features of my invention are capable of use in alternative constructions; and, in general, although I have herein described but a limited number of modifications of my invention, it should be understood not only that various features thereof may be independently employed but that additional modifications might be devised, by those skilled in the art to which this case relates, without the slightest departure from the spirit and scope of my invention, as the same is indicated above and in the following claims.

I claim as my invention:

1. For use in a liquid level control for pressure tanks, a valve control organization comprising: a float chamber; means rendering said float chamber communicative with a pressure tank; a bearing member formed in said float chamber having an inner chamber, an outer recess and a shaft receiving aperture therein; a shaft rotatably mounted in said aperture having a hollow end, extending into said recess; a float mounted in said chamber; a tubular element mounted between said float and said shaft forming internal communication between said float and the hollow end of said shaft; and adjustable means operable by said shaft for operating a control valve.

2. For use in a liquid level control for pressure tanks, a valve control organization comprising: a float chamber; means rendering said float chamber communicative with a pressure tank; a bearing member formed in said float chamber having an inner chamber, an outer recess and a shaft receiving aperture therein; a shaft rotatably mounted in said aperture having a hollow end, extending into said recess; a float mounted in said chamber; a tubular element mounted between said float and said shaft forming internal communication between said float and the hollow end of said shaft; and adjustable means operated by said shaft for operating a control valve, said recess being provided with a cap and means mounted therein rendering said recess communicative with said pressure tank.

3. For use in a liquid level control for pressure tanks, a valve control organization comprising: a float chamber; means rendering said float chamber communicative with a pressure tank; a bearing member formed in said float chamber having an inner chamber, an outer recess and a shaft receiving aperture therein; a shaft rotatably mounted in said aperture having a hollow end, extending into said recess; a float mounted in said chamber; a tubular element mounted between said float and said shaft forming internal communication between said float and the hollow end of said shaft; and adjustable means operable by said shaft for operating a control valve, said shaft being provided with bearing collars in engagement with opposite members within said inner chamber.

4. For use in a liquid level control for pressure tanks, a valve control organization comprising: a float chamber; means rendering said float chamber communicative with a pressure tank; a bearing member formed in said float chamber having an inner chamber, an outer recess and a shaft receiving aperture therein; a shaft rotatably mounted in said aperture having a hollow end, extending into said recess; a float mounted in said chamber; a tubular element mounted between said float and said shaft forming internal communication between said float and the hollow end of said shaft; and adjustable means operable by said shaft for operating a control valve, said shaft being provided with a bearing collar engageable by one face of said inner chamber, and an opposite bearing collar engageable by a washer inwardly pressed by a packing gland.

5. For use in a liquid level control for pressure tanks, a valve control organization comprising: a float chamber; means rendering said float chamber communicative with a pressure tank; a bearing member formed in said float chamber having an inner chamber, an outer recess and a shaft receiving aperture therein; a shaft rotatably mounted in said aperture having a hollow end, extending into said recess; a float mounted in said chamber; a tubular element mounted between said float and said shaft forming internal communication between said float and the hollow end of said shaft; and adjustable means operable by said shaft for operating a control valve, said shaft being provided with a plurality of bearing collars of such diameters as to permit lateral removal thereof through said shaft receiving aperture.

6. For use in the float chamber of a liquid level control: a float; a float support comprising a shaft, one end of which is hollow; bearing collars mounted on said shaft; a shaft bearing member having an inner and an outer chamber, said inner chamber forming part of said float chamber, and said outer chamber receiving the hollow end of said shaft; and a tubular member connecting said float with said shaft.

In testimony whereof, I have hereunto set my hand at Los Angeles, California, this 4th day of September, 1925.

EDWIN C. WEISGERBER.